US009739239B2

(12) United States Patent  (10) Patent No.: US 9,739,239 B2
Dudar  (45) Date of Patent: Aug. 22, 2017

(54) SYSTEM AND METHODS FOR CONTROLLING FUEL VAPOR CANISTER PURGE OPERATIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/004,600

(22) Filed: Jan. 22, 2016

(65) Prior Publication Data

US 2017/0211517 A1  Jul. 27, 2017

(51) Int. Cl.
| | |
|---|---|
| *F02M 25/08* | (2006.01) |
| *B60C 23/04* | (2006.01) |
| *F02D 35/00* | (2006.01) |
| *F02D 41/22* | (2006.01) |

(52) U.S. Cl.
CPC ..... *F02M 25/0827* (2013.01); *B60C 23/0408* (2013.01); *F02D 35/00* (2013.01); *F02D 41/22* (2013.01); *F02M 2025/0863* (2013.01)

(58) Field of Classification Search
CPC .......... F02M 25/0827; F02M 25/0854; F02M 25/0809; F02M 2025/0863; F02D 35/00; F02D 41/0032; F02D 41/0037; F02D 41/021; F02D 41/222; F02D 41/003; F02D 41/22; F02D 2009/0277; B60W 20/00; B60W 20/50; B60C 23/0408; B60C 23/001; G01M 15/09
USPC ................. 123/516, 518, 519, 520
See application file for complete search history.

(56) References Cited

U.S. PATENT DOCUMENTS

| | | | |
|---|---|---|---|
| 5,015,931 A | 5/1991 | Muller | |
| 5,297,424 A | 3/1994 | Sackett | |
| 5,600,301 A | 2/1997 | Robinson, III | |
| 6,003,498 A | 12/1999 | Reddy | |
| 6,650,244 B1 | 11/2003 | Chen et al. | |
| 7,316,224 B2 * | 1/2008 | Chae ................... | F02M 25/0809 123/198 D |
| 7,323,975 B2 | 1/2008 | Hall et al. | |
| 9,261,432 B2 | 2/2016 | Dudar | |
| 2005/0099281 A1 * | 5/2005 | Suzuki ............... | B60C 23/0408 340/442 |

(Continued)

FOREIGN PATENT DOCUMENTS

WO  2004037566 A1  5/2004

*Primary Examiner* — Lindsay Low
*Assistant Examiner* — George Jin
(74) *Attorney, Agent, or Firm* — James Dottavio; McCoy Russell LLP

(57) ABSTRACT

Methods and systems are provided for controlling fuel vapor canister purging operations in an evaporative emissions control system of a vehicle. In one example, responsive to an indication of a decrease in tire pressure greater than a threshold, the evaporative emissions control system may be sealed and canister purging operations may be suspended until the tire pressure rises to another threshold. In this way, during conditions wherein tire pressure is indicated to decrease to a threshold, sealing the evaporative emissions control system and suspending canister purging operations may serve to prevent ingestion of water into the fuel vapor canister, thus prolonging the useful life of the fuel vapor canister and reducing the potential for evaporative emissions.

20 Claims, 5 Drawing Sheets

(56) References Cited

U.S. PATENT DOCUMENTS

2014/0114550 A1     4/2014  Bohr et al.
2014/0303830 A1*   10/2014  Dudar ................ F02M 25/0809
                                                              701/29.1
2015/0032357 A1*    1/2015  Dudar ................... F02D 41/021
                                                              701/103

* cited by examiner

SYSTEM AND METHODS FOR CONTROLLING FUEL VAPOR CANISTER PURGE OPERATIONS

FIELD

The present description relates generally to methods and systems for controlling a vehicle engine to control a canister purging operation based on tire pressure.

BACKGROUND/SUMMARY

Vehicles with an internal combustion engine may be fitted with fuel vapor recovery systems (evaporative emissions control systems) wherein vaporized hydrocarbons (HCs) released from a fuel tank are captured and stored in a fuel vapor canister containing a quantity of fuel-absorbing material such as activated charcoal. Eventually, the fuel vapor canister may become filled with an amount of fuel vapor. The fuel canister may be cleared of fuel vapor by way of a purging operation. A fuel vapor purging operation may include opening a purge valve to introduce the fuel vapor into the cylinder(s) of the internal combustion engine for combustion so that fuel economy may be maintained and fuel vapor emissions may be reduced.

Activated charcoal has been found to be a suitable fuel vapor adsorbing material to be used in such a canister device because of its extremely porous structure and very large surface area to weight ratio. However, this porous structure can lose some of its adsorption efficiency when coated with liquid fuel or water. In one example, during a refueling event a pump operator may add fuel after an initial automatic shut-off. For instance, in an attempt to maximize the amount of fuel pumped into the tank, a pump operator may dispense additional fuel in what is commonly referred to as "trickle-filling". If liquid fuel has entered the fuel vapor recovery lines (evap recovery lines) and a purge cycle is commanded at the next engine start, the liquid can get sucked into the canister and corrupt the activated carbon. In another example, water can enter the canister via a vent line during a purging operation and/or during driving through a flooded area or backing up a vehicle during a boat launch procedure. As vehicle strategy typically purges most of the time during vehicle operating conditions, sealing the evaporative emissions control system and discontinuing purging operations during conditions of high humidity may prevent water from being routed to the canister.

U.S. Pat. No. 6,003,498 teaches a fuel vapor canister purge control strategy in which canister purging operations are adjusted during high humidity conditions. High humidity conditions are detected by monitoring hardware normally available on the vehicle, such as windshield wiper switch state and transmission gear state. In one example, responsive to an indication of an active state of a windshield wiper switch, it is presumed that the vehicle is operating in a high humidity environment, and thus the purge system is disabled to minimize moisture intrusion. Other examples include adjusting purge rate as a function of indicated wiper speed, allowing the purge system to be selectively disabled only during periods of significant rainfall when moisture contamination of the fuel vapor adsorbing material is likely. However, the inventors herein have recognized potential issues with such a method. For example, there may be circumstances wherein the potential for water ingestion into the fuel vapor canister is high, yet the windshield wiper switch may or may not be activated. Examples may include driving through heavy water or during launching a boat. During conditions such as these, correlating canister purge control with windshield wiper state may not always prevent the undesired ingestion of water into the fuel vapor canister.

Thus, the inventors herein have recognized the above issues, and developed systems and methods to at least partially address the above issues. In one example, a method is provided comprising, during vehicle operation, monitoring tire pressure in one or more vehicle tires, and responsive to a tire pressure decrease greater than a threshold, sealing the evaporative emissions control system and suspending purging of the fuel vapor canister.

As one example, barometric pressure may be monitored via a barometric pressure sensor positioned in the engine intake manifold, and the evaporative emissions control system may be sealed and purging of the fuel vapor canister suspended responsive to a tire pressure decrease greater than the threshold, and an absence of a change in barometric pressure. In this way, a change in tire pressure that is not associated with a corresponding change in barometric pressure may be attributed to a cooling of the tires resulting from tire exposure to water, and the evaporative emissions control system sealed accordingly. By sealing the evaporative emissions control system (ceasing venting of the emissions control system) and suspending purging of the fuel vapor canister responsive to an indication of tire exposure to water, fuel vapor canister functional lifetime may be increased, and undesired evaporative emissions prevented.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
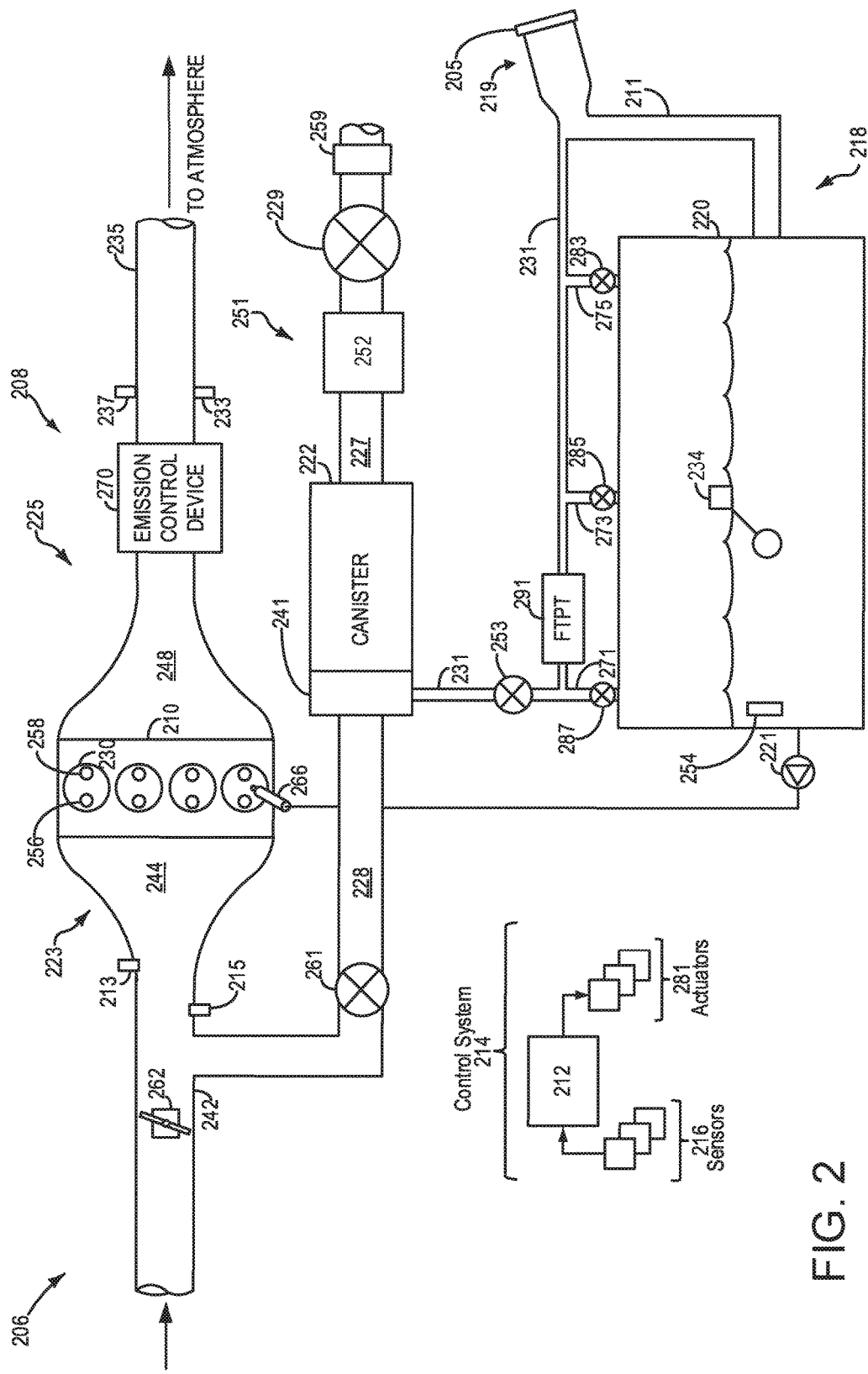
FIG. 2 shows a schematic diagram of a vehicle engine system including an evaporative emission control system.
Figure 3:
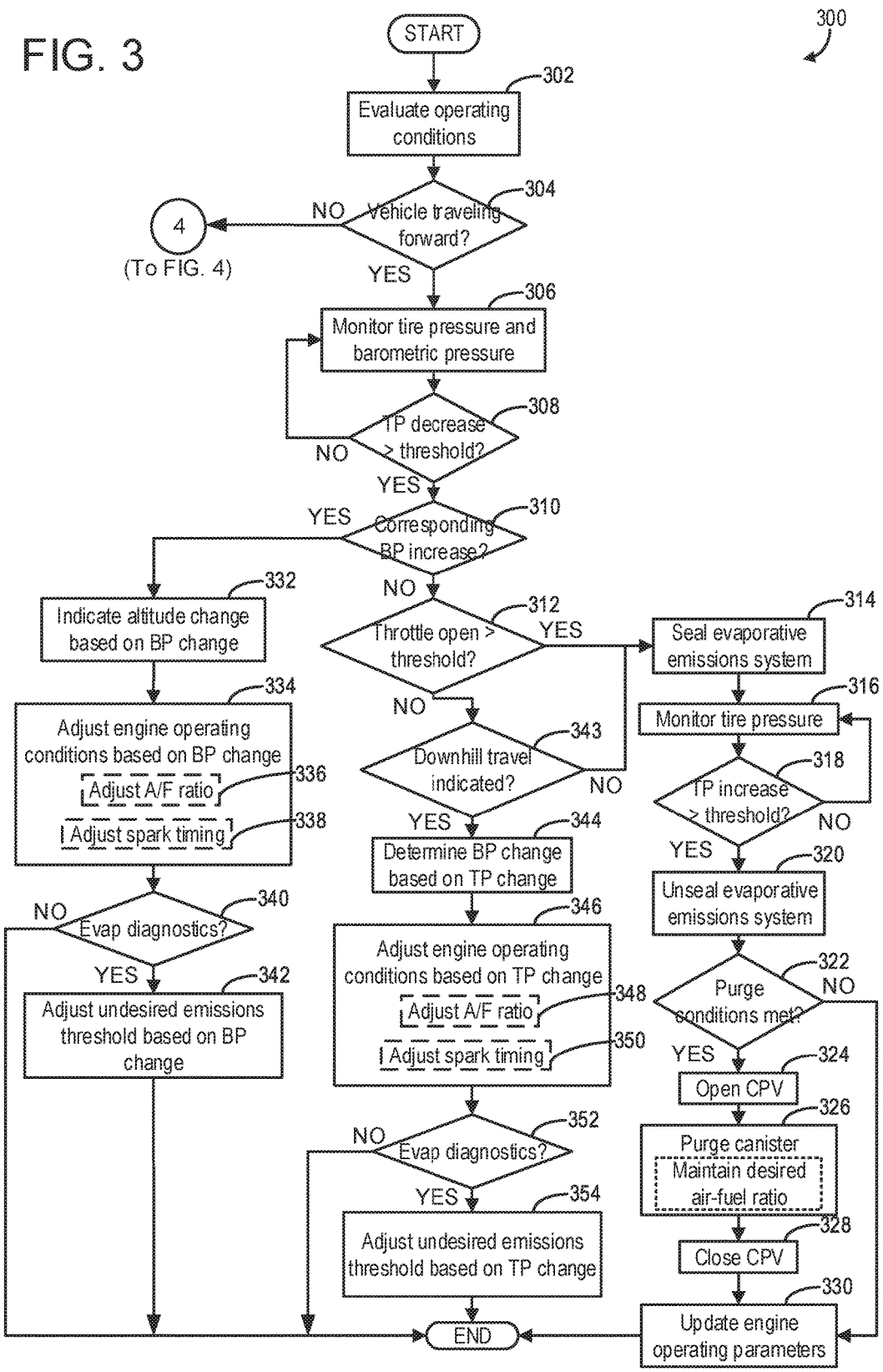
FIG. 3 shows an example method for controlling fuel vapor canister purging operations when a vehicle is indicated to be operating in a forward drive mode.

This detailed description relates to systems and methods for controlling fuel vapor canister purging operations under circumstances wherein water may be unintentionally ingested into the fuel vapor canister if mitigating actions are not undertaken. Specifically, the description relates to indicating a decrease in tire pressure, and responsive to a decrease in tire pressure greater than a threshold, sealing an evaporative emissions control system of the vehicle, and suspending fuel vapor canister purging operations. The system and methods may be applied to a vehicle system capable of indicating tire pressure via tire pressure monitoring sensors (TPMS), such as the hybrid vehicle system depicted in FIG. 1. While a hybrid vehicle is presented, it should be understood that the hybrid vehicle system represents an example vehicle system, and that the system and methods described herein may be applied to any vehicle system capable of indicating tire pressure via TPMS. Furthermore the system and methods may be applied to any vehicle comprising an evaporative emissions control system that is capable of storing fuel vapors and subsequently purging stored fuel vapors to engine intake. For example, the system and methods may be applied to a vehicle with a fuel system coupled to an evaporative emissions control system, as depicted in FIG. 2. A method for controlling fuel vapor canister purging operations while the vehicle is operating in a forward drive mode is illustrated in FIG. 3. Responsive to an indication of a decrease in tire pressure greater than a threshold, if a corresponding increase in barometric pressure is not indicated, the tire pressure decrease may be indicated to be due to a cooling effect of the tires interacting with water. As the vehicle is indicated to be traveling in an undetermined amount of water, the evaporative emissions control system may be sealed, and fuel vapor canister purging operations postponed to prevent water from being ingested into the evaporative emissions system. If the vehicle is indicated to be operating in reverse, tire pressure decreases may similarly be utilized to indicate that the vehicle is operating under conditions where water ingestion into the evaporative emissions control system may be likely, as illustrated by the method depicted in FIG. 4. An example timeline for controlling fuel vapor canister purging operations based on tire pressure is depicted in FIG. 5.

Figure 1:
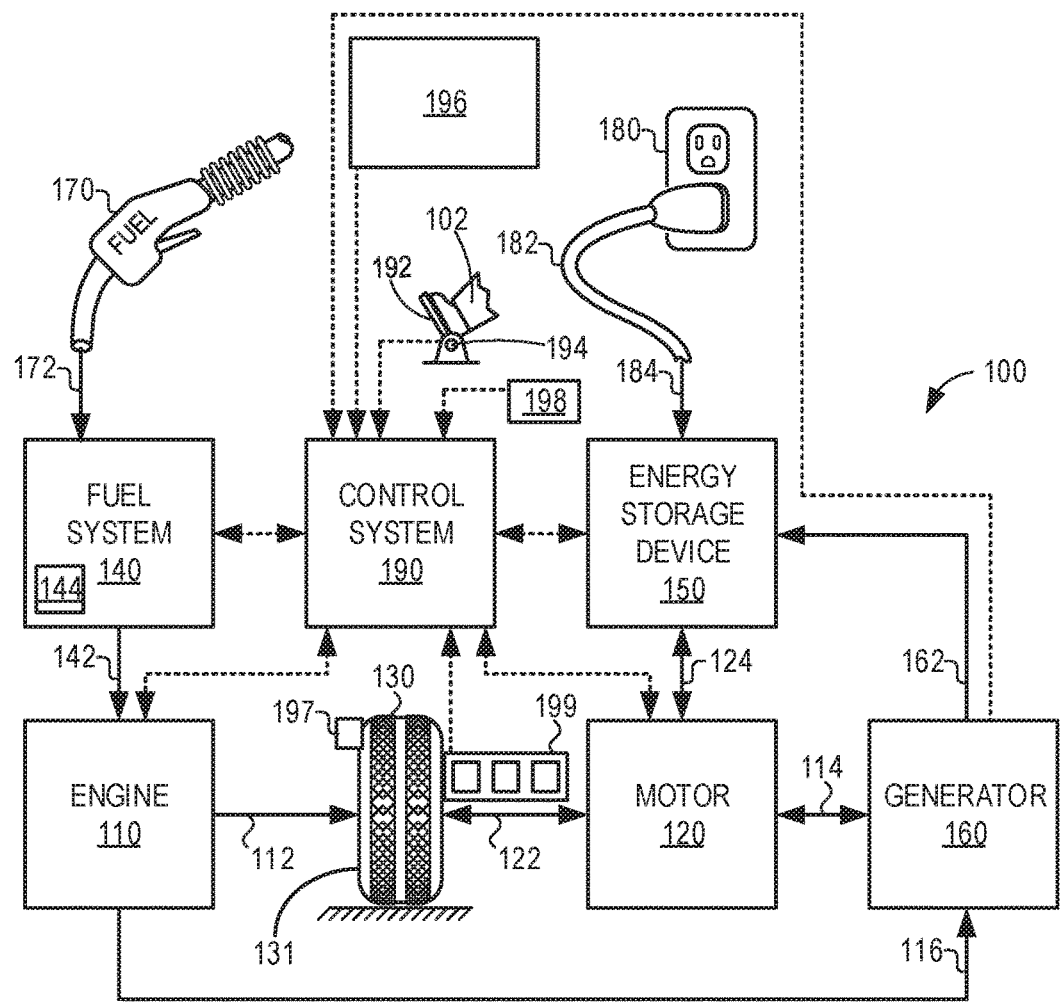
FIG. 1 shows a schematic diagram of an example vehicle propulsion system.

Turning now to the figures, FIG. 1 illustrates an example vehicle propulsion system 100. For example, vehicle system 100 may be a hybrid electric vehicle or a plug-in hybrid electric vehicle. However, it should be understood that, though FIG. 1 shows a hybrid vehicle system, in other examples, vehicle system 100 may not be a hybrid vehicle system and may be propelled solely via engine 110.

Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

In some examples, vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

One or more tire pressure monitoring sensors (TPMS) may be coupled to one or more tires of wheels in the vehicle. For example, FIG. 1 shows a tire pressure sensor 197 coupled to wheel 130 and configured to monitor a pressure in a tire 131 of wheel 130. As described in more detail below, tire pressure sensors can be used as an auxiliary source for determining whether the vehicle is driving through water and/or heavy rain. For example, a tire pressure decrease may indicate that the vehicle is driving through water, or heavy rain, the tire pressure decrease resulting from a cooling of the tire(s). In some examples, as described in more detail below, a tire pressure decrease in the absence of a barometric pressure change may indicate that the vehicle is driving through water or heavy rain. In still other examples, under some conditions changes in tire pressure may be used to indicate a change in barometric pressure. For example, a tire pressure decrease may indicate a decrease in vehicle altitude.

FIG. 2 shows a schematic depiction of a vehicle engine system 206. The vehicle system 206 includes an engine system 208 coupled to an evaporative emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Each cylinder may include at least one intake valve 256 and at least one exhaust valve 258 coupled to an intake camshaft and exhaust camshaft, respectively. In some examples, the intake and exhaust valves may be electronically controlled hydraulic valves that direct high pressure engine oil into a camshaft phaser cavity in an arrangement known as variable camshaft timing (VCT). These oil control solenoids may be bolted into the cylinder heads towards the front of the engine near camshaft phasers. A powertrain control module (PCM) may transmit a signal to the solenoids to move a valve spool that regulates the flow of oil to the phaser cavity. The phaser cavity changes the valve timing by rotating the camshaft slightly from its initial orientation, which results in the camshaft timing being advanced or retarded. The PCM adjusts the camshaft timing depending on factors such as engine load and engine speed (RPM). This allows for more optimum engine performance, reduced emissions, and increased fuel efficiency compared to engines with fixed camshafts. VCT may be used on either the intake or exhaust camshaft. In some examples, both the intake and exhaust camshafts may have VCT, an arrangement designated as Ti-VCT.

The engine 210 includes an engine intake 223 and an engine exhaust 225. The engine intake 223 includes a throttle 262 fluidly coupled to the engine intake manifold 244 via an intake passage 242. The engine intake may include various sensors. For example, a mass air flow (MAF) sensor 213 may be coupled to the engine intake to determine a rate of air mass flowing through the intake. Further, a barometric pressure sensor 215 may be included in the engine intake. For example, barometric pressure sensor 215 may be a manifold air pressure (MAP) sensor and may be coupled to the engine intake downstream of throttle 262. During some conditions, barometric pressure sensor 215 may be used to determine BP changes, e.g., due to altitude changes of the vehicle. However, barometric pressure sensor 215 may rely on part throttle or full or wide open throttle conditions, e.g., when an opening amount of throttle 262 is greater than a threshold, in order accurately determine BP. Thus, during closed throttle conditions, e.g., when an opening amount of throttle 262 is less than the threshold, the sensor may not be able to be used to infer BP. During such conditions, one or more tire pressure sensors may be used to determine BP changes as described in more detail below.

The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves 253 (or vapor bypass valves) may be included in recovery line 231 or in conduits 271, 273, or 275. Among other functions, fuel tank isolation valves (or vapor bypass valves) may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include fuel tank isolation valve 253. Further, in some examples, recovery line 231 may be coupled to a fuel filler system 219. In some examples, fuel filler system may include a fuel cap 205 for sealing off the fuel filler system from the atmosphere. Refueling system 219 may be coupled to fuel tank 220 via a fuel filler pipe or neck 211. A fuel tank pressure transducer (FTPT) 291, or fuel tank pressure sensor, may be included between the fuel tank 220 and fuel vapor canister 222, to provide an estimate of a fuel tank pressure. As another example, one or more fuel tank pressure sensors may be located within fuel tank 220. Further, in some examples, a temperature sensor 254 may also be included in fuel tank 220.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 may be provided to the fuel vapor canister for purging. In other words, the intake manifold may be fluidically coupled to the fuel vapor canister by opening the canister purge valve. In some examples, vent line 227 may include an air filter 259 disposed therein upstream of a canister 222.

In some examples, flow of air and vapors between canister 222 and the atmosphere may be regulated by a canister vent valve 229. In other words, the fuel vapor canister 222 may be fluidically coupled to atmosphere via opening the canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions, for example, in response to a fueling event. In some examples, in PHEV applications, the fuel vapor canister may only adsorb refueling vapors. In this example, diurnal and running loss vapors may be trapped in the sealed fuel tank by use of a vapor isolation valve FTIV 253.

In some applications, an evaporative level check module (ELCM) 252 may be included in emission control system 251, e.g., in a vent path 227 of fuel vapor canister 222, which may be used for generating pressure in the emission control system for evaporative emissions test diagnostics. For example, a pump in the module may evacuate a small volume of air from the emission control system through a reference orifice in the module to obtain a reference pressure. The pump may then be operated to generate decreasing pressure (vacuum) in the evaporative emissions control system which may be monitored by a controller and undesired evaporative emissions may be indicated in response to the pressure in the emission control system remaining above an adjusted reference pressure, where the adjusted reference pressure is based on an actual size or diameter of the reference orifice in the ELCM and the barometric pressure.

In other examples, vacuum from the engine intake or other suitable vacuum source in the engine may be used to generate vacuum or pressure changes in the evaporative emission control system during evaporative emissions test diagnostics. During evaporative emissions testing, pressure changes in the emission control system may be monitored and compared with a threshold or expected pressure change to determine if undesired evaporative emissions are present. This threshold or expected pressure change in the evaporative emissions control system may be adjusted based on barometric pressure. In some examples, barometric pressure may be inferred based on tire pressure, as described in further detail below.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, temperature sensor 254, barometric pressure sensor 215, and tire pressure sensor (e.g. 197). Other sensors such as pressure, temperature, air/fuel ratio, and composition sensors may be coupled to various locations in the vehicle system 206. As another example, the actuators may include fuel injector 266, throttle 262, fuel tank isolation valve 253, ELCM 252, and purge valve 261. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

Turning now to FIG. 3, a flow chart for a high level example method 300 for controlling fuel vapor canister purging operations when a vehicle is in forward drive mode is shown. More specifically, method 300 may be used to indicate a decrease in tire pressure (TP), and if a corresponding change in barometric pressure (BP) is not indicated under conditions wherein a barometric pressure sensor measurement is indicated to be reliable, canister purge operations may be suspended. In this way, a change in TP may be utilized to indicate that the vehicle is traveling through a heavy water condition. By suspending canister purging under such conditions, water may be prevented from being ingested into the fuel vapor canister, thus preserving the functional state of the fuel vapor canister. Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the vehicle system, such as the tire pressure sensors (e.g., 197), the barometric pressure sensor (e.g., 215), and roll stability sensor(s) (e.g., 199) described above with reference to FIG. 1 and FIG. 2, respectively. The controller may employ evaporative emissions system actuators such as the canister purge valve (e.g., 261) and the canister vent valve (e.g., 229) to control fuel vapor canister purge operations, according to the methods described below. Furthermore, other engine, fuel system, and evaporative emissions system actuators may additionally be employed according to the methods described below.

Method 300 begins at 302 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 304, method 300 may include indicating whether the vehicle is traveling in a forward direction. For example, at 304 it may be indicated whether a vehicle transmission state is in a forward drive mode. If at 304, it is indicated that the vehicle is not traveling in a forward direction, method 300 may proceed to the method described in detail in FIG. 4. However, if at 304 it is indicated that the vehicle is traveling in a forward direction, method 300 may proceed to 306.

At 306, method 300 may include monitoring tire pressure (TP) and barometric pressure (BP). For example, at 306, one or more tire pressure sensors coupled to one or more tires of the vehicle may be used to monitor TP. Tire pressure sensors may be used in the vehicle to provide an indication to a vehicle operator of TP in the tires so that the vehicle operator may be alerted if pressure in the tires becomes too low so that air may be added to the tires. For example, if the TP in a tire becomes too low then an indication may be sent to a display in the vehicle to alert the driver. These tire pressure sensors may additionally be used to determine barometric pressure (BP) changes, e.g. due to altitude changes of the vehicle, as will be described in further detail below. Briefly, tire pressure may increase responsive to increasing altitude, and tire pressure may decrease responsive to decreasing altitude, thus providing an indication of BP. Furthermore, these tire pressure sensors may be used to indicate when the vehicle is traveling in a heavy water condition, based on an indicated pressure drop as a result of tire cooling. Additionally, BP may be monitored via a BP sensor in the intake of the engine. For example, a BP sensor may be used to determine BP during engine operating conditions when the engine intake throttle position is greater than a threshold, where the threshold is a throttle opening amount which is large enough to enable a sufficient amount of intake air to reach the BP sensor for BP determination.

Proceeding to 308, method 300 may include indicating whether a TP decrease greater than a threshold is indicated. The threshold may be a predetermined threshold and may be based on an expected pressure decrease responsive to a predetermined temperature decrease. For example, the threshold may be based on the expected TP decrease corresponding to a small change in temperature (e.g., <5° F.), a large change in temperature (e.g., >10° F.), or any range of temperatures in between. At 308, if a TP decrease greater than the predetermined threshold is not indicated, method 300 may include continuing to monitor TP and BP at 306. Alternatively, if at 308 method 300 indicates a TP decrease greater than the predetermined threshold, method 300 may proceed to 310. At 310, method 300 may include indicating whether a corresponding increase in BP is indicated. At 310, an increase in BP may be indicated by the BP sensor. In one example, whether a corresponding increase in BP is indicated may include predicting a BP change based on the indicated TP change at 308, and if the observed BP change at 310 is similar to the BP change expected, then a corresponding increase in BP may be indicated. If at 310, a corresponding increase in BP is not indicated, method 300 may proceed to 312.

At 312, method 300 may include determining whether throttle opening is greater than a threshold. Accurate BP measurements rely on a sufficient amount of intake air reaching the BP sensor for BP determination. As such, at 312, the threshold throttle opening may be a threshold such that accurate BP measurements may be obtained. If at 312 it is indicated that the extent of throttle opening is not greater than the threshold throttle opening, then it may be indicated that the BP pressure determination at 310 is not a valid indication of BP. Alternatively, if at 312 it is indicated that the extent of throttle opening is greater than the threshold, then it may be indicated that the BP determination at 310 is a valid representation of BP. As such, at 312 if it is indicated that the extent of throttle opening is greater than the threshold, method 300 may proceed to 314.

At 314, method 300 may include sealing the evaporative emissions control system. As a TP decrease greater than a predetermined threshold was indicated at 310, and a corresponding BP increase (absence of BP change) was not observed, the indicated TP decrease likely resulted from significant cooling of the vehicle tires due to tire exposure to water. One example may include a vehicle driving through water, as in the case of a flood or heavy rain. Other examples may include a vehicle traversing a stretch of water, such as a small river or stream. As such, if the evaporative emissions control system is not sealed, and if canister purging is not suspended, then water may be ingested into the fuel vapor canister, thus corrupting the activated carbon inside the canister. Accordingly, at 314, method 300 may include closing or maintaining closed the canister purge valve (CPV), closing or maintaining closed the canister vent valve (CVV), and discontinuing any scheduled fuel vapor canister purging operations.

Proceeding to 316, method 300 includes monitoring TP while the evaporative emissions control system is sealed from atmosphere. As described above, monitoring TP may include monitoring one or more TP sensors coupled to one or more tires of the vehicle to indicate TP. Proceeding to 318, method 300 may include indicating whether a TP increase greater than a predetermined threshold is indicated. For example, the predetermined threshold may be a threshold related to an expected tire pressure increase based on a threshold tire temperature increase. In one example, the threshold tire temperature increase may be based on an expected increase in tire temperature responsive to resuming driving wherein the tires are no longer exposed to a significant amount of water. If at 318 a TP increase greater than the predetermined threshold is not indicated, method 300 may include continuing to monitor tire pressure at 316. Alternatively, at 318 if a TP increase greater than the predetermined threshold is indicated, method 300 may proceed to 320.

At 320, method 300 may include unsealing the evaporative emissions control system. For example, unsealing the evaporative emissions control system at 320 may include commanding open the canister vent valve. Proceeding to 322, method 300 may include indicating whether purge conditions are met. For example, purge conditions may include an engine-on condition, a canister load above a threshold, an intake manifold vacuum above a threshold, an estimate or measurement of temperature of an emission control device such as a catalyst being above a predetermined temperature associated with catalytic operation commonly referred to as light-off temperature, a non-steady state engine condition, and other operating conditions that would not be adversely affected by a canister purge operation. If at 322 canister purge conditions are not met, method 300 may proceed to 330. At 330, method 300 may include updating engine operating parameters to include information that the evaporative emissions control system was sealed for a duration, and that canister purge operations were suspended during the duration the evaporative emissions control system was sealed. In one example, at 330, method 300 may include updating a canister purge schedule based on the indication that a canister purge operation did not occur subsequent to unsealing the evaporative emissions control system. For example, a canister purge operation may be scheduled for the next opportunity responsive to canister purge conditions being met. Method 300 may then end.

Returning to 322, if canister purge conditions are met, method 300 may proceed to 324. At 324, method 300 may include commanding open the CPV and commanding open or maintaining open the CVV. In some examples, commanding open the CPV may include gradually opening the CPV. Opening the CPV while concurrently opening or maintaining open the CVV may result in engine intake vacuum drawing fresh air into the canister to promote desorption of adsorbed fuel vapor within the fuel vapor canister, the purge gases routed to engine intake to be combusted. Proceeding to 326, method 300 includes purging the canister. At 326, purging the canister may include indicating an air/fuel ratio via, for example, a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors. The duration of the purging operation may be based on the learned value (or compensation factor) of the vapors such that when it is indicated there are no appreciable hydrocarbons in the vapors (the compensation is essentially zero), the purge may be ended. In other examples, a purge operation may be discontinued responsive to purge conditions no longer being met, for example if intake manifold vacuum decreases below a threshold value. Accordingly, following purging, method 300 may proceed to 328 and may include commanding closed the CPV. Following the closing of the CPV, method 300 may proceed to 330 wherein engine operating parameters may be updated. For example, at 330, updating engine operating parameters may include updating a canister purge schedule to indicate the completed canister purge event, updating the canister loading state to reflect the recent canister purge, etc. Method 300 may then end.

Returning to 310, if a corresponding increase in BP is indicated responsive to an indication of TP decrease greater than a threshold at 308, method 300 may proceed to 332. Briefly, as described above, at 310 whether a corresponding increase in BP is indicated may include predicting a BP change based on the indicated TP change at 308, and if the observed BP change at 310 is similar to the BP change expected, then a corresponding increase in BP may be indicated. A decrease in TP and a corresponding increase in BP may be assumed to indicate a change in altitude. As such, at 332, method 300 may include indicating an altitude change based on the BP change. In this example, a decrease in altitude may be indicated based on the increase in BP. In some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly.

At 334, method 300 includes adjusting engine operating conditions based on the BP change. Various engine and vehicle operations may be adjusted responsive to the change in BP as measured by the BP sensor. For example, method 300 may include adjusting a commanded air/fuel ratio to compensate for the BP change at 336 and/or adjusting a spark timing at 338. For example, as BP increases as a result of an altitude decrease, the air/fuel ratio in the engine may increase. As such, the commanded air/fuel ratio may be decreased to compensate for the BP change. In another example, a more aggressive spark timing may be employed in response to a decrease in altitude (increase in BP), to compensate for the BP change.

Proceeding to 340, method 300 includes determining if evaporative emissions test diagnostics are being performed. For example, evaporative emissions test diagnostics may include applying vacuum to the evaporative emission control system and monitoring corresponding pressure changes. If vacuum in the emission control system increases to a threshold vacuum level, then an absence of undesired evaporative emissions may be indicated. However, if the vacuum does not increase to the vacuum threshold, then undesired evaporative emissions may be indicated. The vacuum threshold for indicating the presence or absence of undesired evaporative emissions may depend on BP. As such, if evaporative emissions test diagnostics are being performed at 340, method 300 may proceed to 342. At 342, method 300 may include adjusting a threshold for indicating undesired evaporative emissions based on the BP change determined via the BP sensor. For example, responsive to an increase in BP (decrease in altitude), the threshold for indicating the absence of undesired evaporative emissions may be increased to compensate for the increase in BP. In some examples (not shown), if an altitude of the vehicle changes so rapidly that the rate of BP change is greater than a threshold, then evaporative emissions test diagnostics may be unreliable, and thus, the evaporative emissions test may be aborted.

Returning to 312, in some examples a TP decrease may be indicated, while a BP change is not indicated (absence of BP change). As such, as described above, at 312 method 300 may include indicating whether throttle opening is greater than a threshold. For example, if throttle opening is not greater than a threshold, then an accurate BP measurement may not be obtained. Such a closed throttle condition may be indicative of a vehicle traveling down a hill wherein engine load is low. Other examples of closed throttle conditions may include conditions wherein a vehicle is not traveling downhill, but wherein engine speed or load is less than a threshold. Such an example may include driving at a low speed through deep water, or sudden release of the gas pedal upon encountering water while driving. Accordingly, if it is indicated that throttle opening is not greater than a threshold, method 300 may proceed to 343 and may include indicating whether the vehicle is likely to be traveling downhill. In other words, at 343, method 300 may include indicating whether the TP decrease is likely due to the vehicle traveling downhill, as opposed to a TP decrease resulting from a sudden cooling of the tires due to encountering water while driving. As such, at 343, method 300 may include obtaining information on vehicle pitch, for example via lateral sensors in the vehicle (e.g. 199). Based on the angle of the vehicle it may be determined that the vehicle is traveling down a hill. If equipped with a global positioning device (GPS), whether the vehicle is traveling downhill may be additionally or alternatively indicated via GPS. A further indication that the vehicle is traveling downhill may be based on vehicle speed compared to TP change. For example, a rapid TP decrease while the vehicle speed is below a threshold may not be consistent with a decrease in vehicle altitude. As such, if at 343 it is indicated that the vehicle is not traveling downhill, method 300 may proceed to 314, as described above, and may include sealing the evaporative emissions control system. The rest of the method may proceed as described above, including monitoring TP and responsive to TP increasing more than a threshold, unsealing the evaporative emissions control system and purging the fuel vapor canister responsive to purge conditions being met.

Alternatively, if at 343 it is indicated that the vehicle is traveling downhill, method 300 may proceed to 344 and may include determining BP change based on TP change. For example, the tire pressure change detected by the tire pressure sensors may be correlated with an associated change in BP. An amount of tire pressure change may be linearly correlated with a BP change. For example, if the tire pressure decreases by an amount then the BP may increase by the same amount. As such, an altitude change may be indicated based on the tire pressure change. In some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly, as described above.

Proceeding to 346, method 300 includes adjusting engine operating conditions based on the tire pressure change. As discussed above, various engine and vehicle operations may depend on an accurate measurement of BP for optimal operation. Thus, various engine and vehicle operations may be adjusted responsive to the change in BP corresponding to the change in TP. For example, method 300 may include adjusting a commanded air/fuel ratio to compensate for the indicated BP change at 348 and/or adjusting a spark timing at 350. For example, as BP increases as a result of an altitude decrease, the air/fuel ratio in the engine may increase. As such, the commanded air/fuel ratio may be decreased to compensate for the BP change. In another example, a more aggressive spark timing may be employed in response to a decrease in altitude (increase in BP), to compensate for the BP change.

Proceeding to 352, method 300 includes determining if evaporative emissions test diagnostics are being performed. For example, as described above, evaporative emissions test diagnostics may include applying vacuum to the evaporative emission control system and monitoring corresponding pressure changes. The vacuum threshold for indicating the presence or absence of undesired evaporative emissions may depend on BP. As such, if evaporative emissions test diagnostics are being performed at 352, method 300 may proceed to 354. At 354, method 300 may include adjusting a threshold for indicating undesired evaporative emissions based on the BP change determined via the TP sensor. For example, responsive to an increase in BP (decrease in altitude), the threshold for indicating the absence of undesired evaporative emissions may be increased to compensate for the increase in BP. In some examples (not shown), if an altitude of the vehicle changes so rapidly that the rate of BP change is greater than a threshold, then evaporative emissions test diagnostics may be unreliable, and thus, the evaporative emissions test may be aborted.

Figure 4:
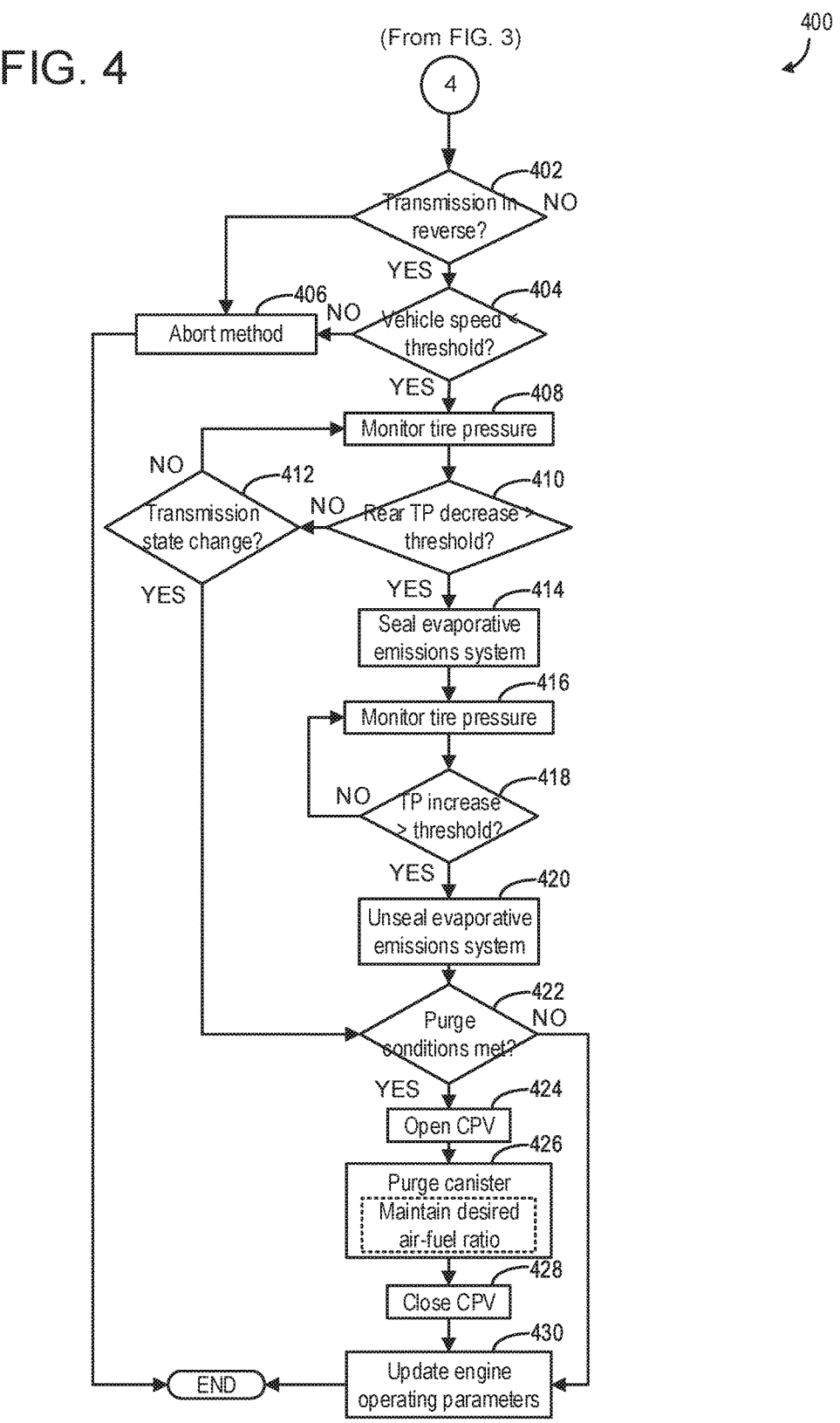
FIG. 4 shows an example method continuing from FIG. 3 for controlling fuel vapor canister purging operations when a vehicle is indicated to be operating in reverse mode.
Figure 5:
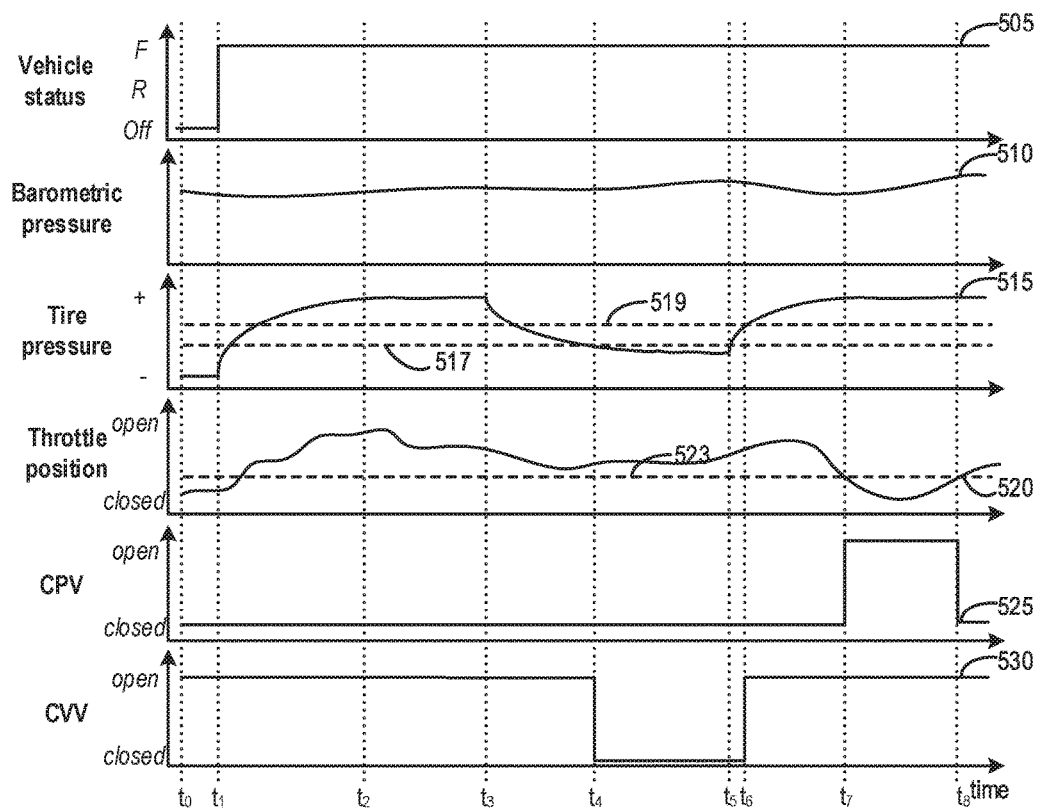
FIG. 5 shows an example timeline for controlling fuel vapor canister purging operations while a vehicle is operating in forward drive mode, according to the method depicted in FIG. 3.

Turning now to FIG. 4, a flow chart for a high level example method 400 for controlling fuel vapor canister purging operations if a vehicle is operating in reverse, is shown. More specifically, method 400 continues from method 300, and may be used to monitor TP while the vehicle is in reverse. If the vehicle is indicated to be in reverse, and traveling at a speed below a threshold, if the two rear tires experience a pressure drop, then it may be indicated that the vehicle is backing up into water, and fuel vapor canister purge operations may be suspended. In this way, when a vehicle is operating in reverse, responsive to a TP decrease fuel vapor canister purging operations may be suspended, thus decreasing the chances of water being ingested into the fuel vapor canister. Method 400 will be described with reference to the systems described herein and shown in FIGS. 1-2, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the vehicle system, such as the tire pressure sensors (e.g., 197) described above with reference to FIG. 1. The controller may employ evaporative emissions system actuators such as the canister purge valve (e.g. 261) and the canister vent valve (e.g., 229) to control fuel vapor canister purge operations, according to the methods described below. Furthermore, other engine, fuel system, and evaporative emissions system actuators may additionally be employed according to the methods described below.

Method 400 begins at 402 and may include indicating whether the vehicle is in reverse. For example, at 402 method 400 may include indicating whether a vehicle transmission is configured in a reverse drive mode. If at 402 it is indicated that the vehicle is not operating in reverse, method 400 may proceed to 406 and may include aborting the method. Method 400 may then end. However, if at 402 it is indicated that the vehicle is in reverse, method 400 may proceed to 404. At 404, method 400 may include indicating whether vehicle speed is below a threshold speed. For example, if the vehicle is traveling in reverse in order to back a boat into water, the vehicle speed may be below a threshold speed. If the vehicle is not indicated to be traveling below the threshold speed, then the method may proceed to 406, and may include aborting method 400. For example, if the vehicle is traveling at a speed greater than the threshold speed, method 400 may not be applicable. In one example wherein method 400 may not be applicable, a vehicle may be traveling at a speed greater than a threshold speed down a hill in reverse. Under such conditions, a TP decrease may be observed, but the TP decrease may be due to a change in BP. Under such circumstances method 400 may be aborted. Method 400 may then end.

Returning to 404, if it is indicated that the vehicle is operating in reverse at a speed below the threshold speed, method 400 may proceed to 408. At 408, method 400 may include monitoring tire pressure. As described above with regard to method 300, tire pressure sensors may be coupled to one or more tires of the vehicle and may be used to monitor TP. With regard to method 400, it should be understood that in order for the method to be applicable, TP sensors must be present in one or more rear wheel tires, and may additionally be present in one or more front wheel tires. As discussed above, such TP sensors may be used to provide an indication to a vehicle operator when TP becomes too low so that air may be added to the tires. Furthermore, TP sensors may be used to indicate when the tires are exposed to water, based on the pressure drop as a result of tire cooling.

Proceeding to 410, method 400 includes indicating whether a TP decrease greater than a threshold in the rear wheel tire(s) is indicated. The threshold may be a predetermined threshold and may be based on an expected pressure decrease responsive to a predetermined temperature decrease. For example, the threshold may be based on the expected TP decrease corresponding to a small change in temperature (e.g., <5° F.), a large change in temperature (e.g., >10° F.), or any range of temperatures in between. In one example, if the vehicle is equipped with TP sensors in both rear wheel tires, at 410 indicating TP decrease greater than a threshold may comprise indicating that both rear wheel tires have experienced a TP decrease greater than the threshold. Alternatively, if the vehicle is only equipped with a TP sensor in one of the rear wheel tires, then at 410, indicating TP decrease greater than a threshold may comprise indicating TP decrease greater than a threshold in the tire with the TP sensor. Furthermore, if the vehicle is equipped with TP sensors additionally in one or more of the front wheel tires, indicating a TP decrease greater than a threshold may include indicating a TP decrease greater than a threshold in the rear tires, and additionally a TP decrease greater than a threshold in the front wheel tires. Such an example may occur in a situation where a vehicle backs into water such that all four tires make significant contact with the water and thus cooling (TP decrease) occurs in all four tires.

If at 410, a TP decrease greater than a threshold is not indicated, method 400 may proceed to 412. At 412, method 400 may include indicating whether a change in the state of the transmission is indicated. For example, a vehicle may have been operating in reverse at a low speed, and changed to operating in a forward mode without the tires indicating a pressure drop greater than a threshold. Such an example may comprise any number of conditions encountered in every day driving situations (e.g. backing out of a driveway and then driving in forward mode). If at 412 it is indicated that a transmission state of the vehicle has not changed, and that the vehicle is still operating in reverse, then method 400 may return to 408 and may include continuing to monitor TP. Alternatively, if a change in transmission state is indicated at 412, for example a change from operating in reverse to operating in forward mode, method 400 may proceed to 422.

At 422, method 400 may include indicating whether purge conditions are met. As described above with regard to method 300, purge conditions may include an engine-on condition, a canister load above a threshold, an intake manifold vacuum above a threshold, an estimate or measurement of temperature of an emission control device above a threshold, a non-steady state engine condition, etc. If at 422, purge conditions are not met, method 400 may proceed to 430. At 430, method 400 may include updating engine operating parameters to include information that a canister purge event did not occur, and a canister purge operation may be scheduled for the next opportunity responsive to canister purge conditions being met. Method 400 may then end.

Returning to 422, if canister purge conditions are met, method 400 may proceed to 424. At 424, method 400 may include commanding open the CPV and commanding open or maintaining open the CVV. In some examples, as described above with regard to method 300, commanding open the CPV may include gradually opening the CPV. Proceeding to 426, method 400 may include purging the canister. At 426, purging the canister may include indicating an air/fuel ratio via a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors. The duration of the purging operation may be based on the learned value (or compensation factor) of the vapors such that when it is indicated there are no appreciable hydrocarbons in the vapors (the compensation is essentially zero), the purge may be ended. In other examples, a purge operation may be discontinued responsive to purge conditions no longer being met, for example if intake manifold vacuum decreases below a threshold value. Following purging, method 400 may proceed to 428 and may include commanding closed the CPV. Following the closing of the CPV, method 400 may proceed to 430 wherein engine operating parameters may be updated. For example, at 430, updating engine operating parameters may include updating a canister purge schedule to indicate the completed canister purge event, updating the canister loading state to reflect the recent canister purge, etc. Method 400 may then end.

Returning to 410, if a TP decrease is indicated in the one or more rear tires (or one or more rear tires and one or more front tires) while the vehicle is operating in reverse at a speed below a threshold, method 400 may proceed to 414. At 414, method 400 may include sealing the evaporative emissions control system. As a TP decrease in the one or more rear tires was indicated at 410, the indicated TP decrease likely resulted from significant cooling of the vehicle tires due to tire exposure to water, such as that which may occur responsive to a vehicle backing into water. As such, if the evaporative emissions system is not sealed, and if canister purging is not suspended, then water may be ingested into the fuel vapor canister, thus corrupting the activated carbon inside the canister. Accordingly, at 414, method 400 may include closing or maintaining closed the CPV, closing or maintaining closed the CVV, and discontinuing any scheduled fuel vapor canister purging operations.

Proceeding to 416, method 400 includes monitoring TP while the evaporative emissions control system is sealed from atmosphere. As described above, monitoring TP may include monitoring one or more TP sensors coupled to one or more tires of the vehicle to indicate TP. For example, if a TP decrease was only indicated in the one or more rear tires, then at 416 monitoring tire pressure may include monitoring the rear wheel tire(s) for an increase in TP that would indicate the tires no longer are in contact with water. In another example, if a TP decrease was indicated in one or more of the rear tires and one or more of the front tires, then at 416 monitoring tire pressure may include monitoring all tires that indicated a pressure decrease for an increase in TP that would indicate that the tires are no longer in contact with the water. As such, proceeding to 418, method 400 may include indicating whether a TP increase greater than a threshold in the one or more rear wheel tires (or the one or more rear wheel tires and the one or more front wheel tires), is indicated. If at 418 a TP increase greater than the predetermined threshold is not indicated, method 400 may include continuing to monitor tire pressure at 416. Alternatively, at 418 if a TP increase greater than the predetermined threshold is indicated, method 400 may proceed to 420.

At 420, method 400 may include unsealing the evaporative emissions control system. For example, unsealing the evaporative emissions control system at 420 may include commanding open the canister vent valve. Proceeding to 422, method 400 may include indicating whether purge conditions are met. As described in detail above, if purge conditions are not met, method 400 may proceed to 430 and may include updating engine operating parameters to include information that the evaporative emissions system was sealed for a duration and that subsequent to unsealing the evaporative emissions system a canister purge operation was not performed. As such at 430, method 400 may include updating a canister purge schedule such that a canister purge operation is performed at the next opportunity, responsive to canister purge conditions being met. Method 400 may then end.

Returning to 422, if purge conditions are met, method 400 may include opening the CPV and commanding open or maintaining open the CVV and purging the canister as described in detail above. Subsequent to purging the canister, the CPV may be closed, and engine operating parameters may be updated to include information that a canister purge operation was performed. For example, at 430, method 400 may include updating the canister loading state to reflect the recent canister purge, etc. Method 400 may then end.

FIG. 5 shows an example timeline 500 for controlling fuel vapor canister purge operations responsive to indications of a decrease in tire pressure according to the methods described herein and with reference to FIGS. 3-4, and as applied to the systems described herein and with reference to FIGS. 1-2. Timeline 500 includes plot 505, indicating a vehicle operational status, over time. For example, plot 505 may indicate whether the vehicle is off, or whether the vehicle is in operation and whether the vehicle transmission is in forward (F), or reverse (R). Timeline 500 further includes plot 510, indicating a measured barometric pressure, over time. For example, BP may be indicated via a barometric pressure sensor positioned in the intake manifold of the vehicle engine (e.g. 215). Timeline 500 further includes plot 515, indicating tire pressure in one or more tires, over time. For example, tire pressure may be monitored by one or more tire pressure sensors (e.g. 197) coupled to one or more tires in the vehicle. Line 517 represents a first threshold tire pressure level, comprising a predetermined tire pressure. The predetermined tire pressure may correspond to a tire pressure expected responsive to a predetermined tire temperature decrease. For example, if the one or more tires undergo a predetermined (or greater) level of cooling, it may be expected that the tire pressure may decrease to (or beyond) the first threshold pressure level. Responsive to an indication that the TP has reached or exceeded the first threshold pressure level, in some examples the evaporative emissions system may be sealed, and fuel vapor canister purging may be suspended, as described above with regard to the methods depicted in FIG. 3 and FIG. 4. Line 519 represents a second threshold tire pressure, indicating a tire pressure expected responsive to a predetermined increase in tire temperature. In some examples, described above with regard to the methods depicted in FIG. 3 and FIG. 4, responsive to a TP increase meeting or exceeding the second tire pressure threshold (subsequent to a tire pressure decrease below the first threshold tire pressure level), the evaporative emissions control system may be unsealed, and fuel vapor canister purging operations may be resumed. Method 500 further includes plot 520, indicating a throttle position, over time. Line 523 represents a threshold amount of throttle opening, indicating a level of throttle opening that may enable reliable readings of BP from the BP sensor. Method 500 further includes plot 525, indicating whether the CPV is in an open or closed position, and plot 530, indicating whether the CVV is in an open or closed position, over time.

At time $t_0$ the vehicle is in an off state, indicated by plot 505. The CPV is closed, indicated by plot 525, and the CVV is open, indicated by plot 530. The position of the throttle, indicated by plot 520, is mainly closed. At time $t_1$ the vehicle is turned on, and driving is initiated in the forward direction. As driving is initiated, the tire pressure of the one or more tires, indicated by the one or more tire pressure sensors (e.g., 197), begins to rise, as indicated by plot 515. Between time $t_1$ and $t_2$, while the vehicle is in operation and driving forward, tire pressure rises and plateaus. Throttle position varies as a function of vehicle operating conditions, indicated by plot 520. BP, as monitored by the BP sensor, remains steady. As the throttle position is indicated to be open more than a threshold level, represented by line 523, BP readings may be considered reliable. The CPV remains closed, and the CVV remains open. As such, a canister purge operation is not indicated.

Between time $t_2$ and $t_3$ tire pressure remains constant. However, at time $t_3$, tire pressure begins to drop. Between time $t_3$ and $t_4$ tire pressure is indicated to decrease, while BP is indicated to remain steady. As the throttle position is indicated to be open greater than the threshold level, BP readings may be considered reliable. At time $t_4$ tire pressure decreases to the first predetermined tire pressure threshold level, represented by line 517. Because the throttle position remains open greater than the threshold level, the TP decrease is indicated to be due to a temperature decrease, and not a potential decrease in altitude, as the BP remains steady and the BP reading is reliable. Thus, the cause of tire pressure decrease may be indicated to be due to the tires coming into contact with water, resulting in cooling of the tires and a corresponding decrease in tire pressure. As such, at time $t_4$ the CVV is commanded closed in order to seal the evaporative emissions control system. Furthermore, the CPV is maintained closed, and any scheduled fuel vapor canister purge operations may be postponed. By sealing the evaporative emissions control system and postponing any fuel vapor canister purge operations, potential ingestion of water into the fuel vapor canister may be prevented.

Between time $t_4$ and $t_5$, tire pressure remains below the first predetermined tire pressure threshold. As such, the evaporative emissions system remains sealed. At time $t_5$ tire pressure begins to increase. Between time $t_5$ and $t_6$ tire pressure continues to increase and at time $t_6$ tire pressure reaches a second predetermined tire pressure threshold, represented by line 519. As the second predetermined tire pressure threshold is reached at time $t_6$ (and no corresponding change in BP is indicated although the throttle position remains open more than the threshold), the increase in tire pressure may be indicated to be due to warming of the tire. Warming of the tire to the second predetermined tire pressure threshold during vehicle operation in the forward direction may occur responsive to the vehicle tires not being in contact with the water that resulted in cooling. As such, at time $t_6$, the evaporative emissions control system may be unsealed, and canister purging operations may be resumed, responsive to canister purging conditions being met. Accordingly, at time $t_6$ the CVV is commanded open, unsealing the evaporative emissions control system. However, canister purging is not initiated, as canister purge conditions are not met. For example, as the throttle is open significantly above the threshold, intake manifold vacuum may not be sufficient to conduct a robust canister purge operation. Between time $t_6$ and $t_7$, tire pressure rises and plateaus, and throttle position varies as a function of engine operating conditions.

At time $t_7$, the position of the throttle falls below the threshold. As described above, the threshold represented by line 523 was indicated to be a threshold wherein above which BP readings were reliable, and below which BP readings were not reliable. Accordingly, a throttle position at or below the threshold represented by line 523 may additionally represent a level of intake manifold vacuum sufficient to perform a canister purging operation. As such, at time $t_7$ the CPV may be commanded open, the CVV may be maintained open, and intake manifold vacuum may route fresh air across the canister. Between time $t_7$ and $t_8$ the routing of fresh air across the canister may serve to desorb adsorbed hydrocarbons, whereupon the desorbed hydrocarbons may be routed to the engine intake to be combusted. As described above with regard to the methods depicted in FIG. 3 and FIG. 4, purging may be monitored and may include compensating for the purge vapors by subtracting a compensation factor from a base fuel command to correct for the induction of fuel vapors. Purging may be discontinued responsive to an indication of an absence of appreciable hydrocarbons in the vapors, or responsive to purge conditions no longer being met, for example if intake manifold vacuum decreases to less than a threshold value. As such, at time $t_8$ throttle position is indicated to be open greater than the threshold represented by line 523. As the opening of the throttle may indicate an intake manifold vacuum that is not sufficient for purging the fuel vapor canister, the CPV may be commanded closed and purging may be stopped.

In this way, canister purge operations may be controlled based on tire pressure. By monitoring tire pressure and barometric pressure concurrently, it may be determined whether an observed tire pressure decrease is likely due to a decrease in altitude, or likely due to a significant cooling effect resulting from the tires coming into contact with water. For example, an indicated tire pressure decrease and a concurrent barometric pressure increase may indicate a change in altitude, and as such, engine operating conditions may be adjusted based on the change in barometric pressure. Alternatively, an indicated tire pressure decrease and a lack of barometric pressure change may indicate that the tires experienced a significant cooling effect. As the cooling and corresponding pressure decrease may result from the vehicle tires coming into contact with water, the evaporative emissions control system may be sealed and any fuel vapor canister purging operations may be suspended. As such, by monitoring tire pressure and sealing the evaporative emissions control system responsive to an indication that a tire pressure decrease is likely due to the interaction of the tires with water, ingestion of water into the fuel vapor canister may be prevented. Preventing water from contacting the fuel vapor canister may serve to prolong the effective lifetime of the fuel vapor canister, and may thus prevent undesired evaporative emissions.

The technical effect of controlling fuel vapor canister purge operations responsive to an indication of tire pressure decrease is to recognize that tire pressure monitoring systems in the vehicle may be used to indicate when the vehicle tires have come into contact with water, and that this information may be advantageously applied to the evaporative emissions system. In one example, by correlating a decrease in tire pressure with a lack of corresponding increase in barometric pressure, it may be readily determined that the tire pressure decrease is due to tire interaction with water. As such, conditions may be present that may adversely affect the function of the fuel vapor canister if mitigating actions are not undertaken. Sealing the evaporative emissions control system and discontinuing fuel vapor canister purging until tire pressure rises may prolong the useful life of the canister and prevent undesired evaporative emissions. Further, utilizing a change in tire pressure to control fuel vapor canister purge operations comprises a significant benefit over previous solutions. For example, the use of wiper switch state may indicate a high humidity environment, however there may be circumstances wherein wiper switch state may not adequately indicate potential adverse situations where water ingestion into the fuel vapor canister may be likely. One example may include a vehicle driving in/through a body of water during conditions wherein the vehicle's wipers are not activated. Another example may include a situation where a vehicle is backing a boat into water, wherein a pressure drop may be used to indicate the vehicle tires are exposed to water, and wherein the vehicle's wipers may not be activated. Sealing the evaporative emissions control system and discontinuing fuel vapor canister purging based on tire pressure decrease therefore presents an advance over prior methods. Specifically, by making use of tire pressure indications to control fuel vapor canister purging operations, the conditions wherein control over fuel vapor canister purging operations is desired may be broadened.

The systems described herein and with reference to FIGS. 1-2, along with the methods described herein and with reference to FIGS. 3-4, may enable one or more systems and one or more methods. In one example, a method comprises, during vehicle operation, monitoring tire pressure in one or more vehicle tires; and responsive to a tire pressure decrease greater than a threshold: sealing an evaporative emissions control system comprising a fuel vapor canister for capturing and storing fuel vapors, the evaporative emissions control system coupled to an engine intake manifold; and suspending purging of the fuel vapor canister. In a first example of the method, the method further comprises monitoring barometric pressure via a barometric pressure sensor positioned in the engine intake manifold; and wherein sealing the evaporative emissions control system further comprises: sealing the evaporative emissions control system responsive to the tire pressure decrease greater than the threshold, and an absence of a change in barometric pressure as monitored by the barometric pressure sensor. A second example of the method optionally includes the first example and further comprises controlling an intake air amount inducted into the engine intake manifold via a throttle; and wherein sealing the evaporative emissions control system responsive to the tire pressure decrease greater than the threshold, and an absence of a change in barometric pressure includes indicating that a throttle position is greater than a throttle position threshold. A third example of the method optionally includes any one or more or each of the first and second examples and further includes wherein the throttle position threshold comprises the throttle position where the intake air amount enables accurate barometric pressure readings as monitored by the barometric pressure sensor. A fourth example of the method optionally includes any one or more or each of the first through third examples and further comprises monitoring vehicle pitch angle via one or more lateral sensors in the vehicle, wherein a vehicle pitch angle greater than a threshold pitch angle indicates the vehicle is traveling downhill; and responsive to the absence of a change in barometric pressure and the throttle position less than the throttle position threshold: sealing the evaporative emissions control system responsive to the vehicle pitch angle less than the threshold pitch angle. A fifth example of the method optionally includes any one or more or each of the first through fourth examples and further includes wherein responsive to the absence of a change in barometric pressure and the throttle position less than the throttle position threshold: indicating barometric pressure change based on the tire pressure change responsive to the vehicle pitch angle greater than the threshold pitch angle. A sixth example of the method optionally includes any one or more or each of the first through fourth examples and further comprises adjusting a commanded air/fuel ratio to compensate for the indicated barometric change based on the tire pressure change. A seventh example of the method optionally includes any one or more or each of the first through sixth examples and further comprises applying vacuum to the evaporative emissions control system and indicating the presence of undesired evaporative emissions responsive to a vacuum level reaching a vacuum threshold; adjusting the vacuum threshold based on a change in barometric pressure, the change in barometric pressure based on the tire pressure change; and wherein adjusting the vacuum threshold includes increasing the vacuum threshold responsive to a decrease in tire pressure. An eighth example of the method optionally includes any one or more or each of the first through seventh examples and further includes wherein vehicle operation comprises the vehicle being propelled in a forward direction by the engine coupled to one or more sets of drive wheels, or wherein the vehicle is being propelled in a forward direction by an electric motor coupled to one or more sets of drive wheels. A ninth example of the method optionally includes any one or more or each of the first through eighth examples and further comprises unsealing the evaporative emissions control system responsive to a tire pressure increase greater than another threshold, subsequent to the tire pressure decrease greater than a threshold; and resuming purging of the fuel vapor canister. A tenth example of the method optionally includes any one or more or each of the first through ninth examples and further comprises fluidically coupling the fuel vapor canister to the engine intake manifold by opening a canister purge valve; fluidically coupling the fuel vapor canister to atmosphere by opening a canister vent valve; wherein purging of the fuel vapor canister comprises commanding open the canister purge valve and the canister vent valve under conditions of intake manifold vacuum to draw atmospheric air across the fuel vapor canister to desorb stored fuel vapors and draw them to the engine intake for combustion; wherein sealing the evaporative emissions control system comprises closing the canister purge valve and closing the canister vent valve; and wherein unsealing the evaporative emissions control system comprises opening the canister vent valve. An eleventh example of the method optionally includes any one or more or each of the first through tenth examples and further includes wherein vehicle operation comprises the vehicle being propelled in a reverse direction by an engine coupled to one or more sets of drive wheels, or wherein the vehicle is being propelled in a reverse direction by an electric motor coupled to one or more sets of drive wheels. A twelfth example of the method optionally includes any one or more or each of the first through eleventh examples and further includes wherein sealing the evaporative emissions control system responsive to the tire pressure decrease greater than the threshold further comprises: indicating a vehicle speed below a threshold vehicle speed. A thirteenth example of the method optionally includes any one or more of the first through twelfth examples and further includes wherein sealing the evaporative emissions control system responsive to the tire pressure decrease greater than the threshold further comprises: indicating that at least one or more rear tires experience the tire pressure decrease greater than the threshold.

Another example of a method comprises venting a vapor storage canister to atmosphere, the canister coupled to both a fuel tank and an engine intake manifold of a motor vehicle having at least four tires; and ceasing the venting in response to a tire pressure change in a predetermined number of tires exceeding a threshold. In a first example of the method, the method further includes wherein the tire pressure change comprises one or more of two rear tires in response to predetermined conditions. A second example of the method optionally includes the first example and further includes wherein the pressure change comprises one or more of four tires in response to predetermined conditions. A third example of the method optionally includes any one or more of the first and second examples and further comprises purging the canister by venting one side of the canister to atmosphere and coupling an opposite side of the canister to the intake manifold; and disabling the purging in response to the tire pressure change in a predetermined number of tires exceeding the threshold.

An example of a system for a vehicle comprises an engine; a fuel vapor canister, configured within an evaporative emissions control system, fluidically coupled to an engine intake manifold via a canister purge valve, and fluidically coupled to atmosphere via a canister vent valve; a barometric pressure sensor in the engine intake manifold; an intake throttle in the intake of the engine; one or more lateral sensors; one or more tire pressure sensors coupled to one or more tires of the vehicle; a controller storing instructions in non-transitory memory, that when executed, cause the controller to: responsive to the vehicle being propelled in a forward direction by an engine coupled to one or more sets of drive wheels: monitor tire pressure in the one or more vehicle tires; monitor barometric pressure via the barometric pressure sensor; control an intake air amount inducted into the engine intake manifold via the throttle when the vehicle is being propelled in the forward direction by the engine; monitor vehicle pitch angle via the one or more lateral sensors in the vehicle, wherein a vehicle pitch angle greater than a threshold pitch angle indicates the vehicle is traveling downhill; seal the evaporative emissions control system by closing the canister purge valve and closing the canister vent valve, and suspend purging of the fuel vapor canister responsive to a tire pressure decrease greater than a threshold and an absence of change in barometric pressure; wherein the absence of change in barometric pressure includes indicating that a throttle position is greater than a throttle position threshold, the throttle position greater than the throttle position threshold indicating accurate barometric pressure readings as monitored by the barometric pressure sensor; and wherein responsive to the absence of a change in barometric pressure and the throttle position less than the throttle position threshold, sealing the evaporative emissions control system and suspending purging of the fuel vapor canister responsive to the vehicle pitch angle less than the threshold pitch angle. In a first example, the system further includes wherein the controller further stores instructions in non-transitory memory, that when executed, cause the controller to: responsive to the vehicle being propelled in a reverse direction by the engine, or by an electric motor coupled to one or more sets of drive wheels: monitor tire pressure in the one or more vehicle tires; and seal the evaporative emissions control system by closing the canister purge valve and closing the canister vent valve, and suspending purging of the fuel vapor canister responsive to a vehicle speed below a threshold vehicle speed, and a tire pressure decrease greater than the threshold, wherein at least one or more rear tires experience the tire pressure decrease.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during vehicle operation, monitoring tire pressure in one or more vehicle tires; and
responsive to a tire pressure decrease greater than a threshold:

sealing an evaporative emissions control system comprising a fuel vapor canister for capturing and storing fuel vapors, the evaporative emissions control system coupled to an engine intake manifold; and
suspending purging of the fuel vapor canister.

2. The method of claim 1, further comprising:
monitoring barometric pressure via a barometric pressure sensor positioned in the engine intake manifold; and
wherein sealing the evaporative emissions control system further comprises:
sealing the evaporative emissions control system responsive to the tire pressure decrease greater than the threshold, and an absence of a change in barometric pressure as monitored by the barometric pressure sensor.

3. The method of claim 2, further comprising:
controlling an intake air amount inducted into the engine intake manifold via a throttle; and
wherein sealing the evaporative emissions control system responsive to the tire pressure decrease greater than the threshold, and an absence of a change in barometric pressure includes indicating that a throttle position is greater than a throttle position threshold.

4. The method of claim 3, wherein the throttle position threshold comprises the throttle position where the intake air amount enables accurate barometric pressure readings as monitored by the barometric pressure sensor.

5. The method of claim 3, further comprising:
monitoring vehicle pitch angle via one or more lateral sensors in the vehicle, wherein a vehicle pitch angle greater than a threshold pitch angle indicates the vehicle is traveling downhill; and
responsive to the absence of a change in barometric pressure and the throttle position less than the throttle position threshold:
sealing the evaporative emissions control system responsive to the vehicle pitch angle less than the threshold pitch angle.

6. The method of claim 5, wherein responsive to the absence of a change in barometric pressure and the throttle position less than the throttle position threshold:
indicating barometric pressure change based on the tire pressure change responsive to the vehicle pitch angle greater than the threshold pitch angle.

7. The method of claim 6, further comprising:
adjusting a commanded air/fuel ratio to compensate for the indicated barometric change based on the tire pressure change.

8. The method of claim 6, further comprising:
applying vacuum to the evaporative emissions control system and indicating a presence of undesired evaporative emissions responsive to a vacuum level reaching a vacuum threshold;
adjusting the vacuum threshold based on a change in barometric pressure, the change in barometric pressure based on the tire pressure change; and
wherein adjusting the vacuum threshold includes increasing the vacuum threshold responsive to a decrease in tire pressure.

9. The method of claim 2, wherein vehicle operation comprises the vehicle being propelled in a forward direction by the engine coupled to one or more sets of drive wheels, or wherein the vehicle is being propelled in a forward direction by an electric motor coupled to one or more sets of drive wheels.

10. The method of claim 1, further comprising:
unsealing the evaporative emissions control system responsive to a tire pressure increase greater than another threshold, subsequent to the tire pressure decrease greater than a threshold; and
resuming purging of the fuel vapor canister.

11. The method of claim 10, further comprising:
fluidically coupling the fuel vapor canister to the engine intake manifold by opening a canister purge valve;
fluidically coupling the fuel vapor canister to atmosphere by opening a canister vent valve;
wherein purging of the fuel vapor canister comprises commanding open the canister purge valve and the canister vent valve under conditions of intake manifold vacuum to draw atmospheric air across the fuel vapor canister to desorb stored fuel vapors and draw them to the engine intake for combustion;
wherein sealing the evaporative emissions control system comprises closing the canister purge valve and closing the canister vent valve; and
wherein unsealing the evaporative emissions control system comprises opening the canister vent valve.

12. The method of claim 1, wherein vehicle operation comprises the vehicle being propelled in a reverse direction by an engine coupled to one or more sets of drive wheels, or wherein the vehicle is being propelled in a reverse direction by an electric motor coupled to one or more sets of drive wheels.

13. The method of claim 12, wherein sealing the evaporative emissions control system responsive to the tire pressure decrease greater than the threshold further comprises:
indicating a vehicle speed below a threshold vehicle speed.

14. The method of claim 12, wherein sealing the evaporative emissions control system responsive to the tire pressure decrease greater than the threshold further comprises:
indicating that at least one or more rear tires experience the tire pressure decrease greater than the threshold.

15. A method comprising:
venting a vapor storage canister to atmosphere, the canister coupled to both a fuel tank and an engine intake manifold of a motor vehicle having at least four tires; and
ceasing the venting in response to a tire pressure change in a predetermined number of tires exceeding a pressure threshold.

16. The method of claim 15, wherein the tire pressure change comprises one or more of two rear tires in response to predetermined conditions.

17. The method of claim 15, wherein the pressure change comprises one or more of four tires in response to predetermined conditions.

18. The method of claim 15, further comprising: purging the canister by venting one side of the canister to atmosphere and coupling an opposite side of the canister to the intake manifold; and disabling the purging in response to the tire pressure change in a predetermined number of tires exceeding the threshold.

19. A system for a vehicle, comprising:
an engine;
a fuel vapor canister, configured within an evaporative emissions control system, fluidically coupled to an engine intake manifold via a canister purge valve, and fluidically coupled to atmosphere via a canister vent valve;
a barometric pressure sensor in the engine intake manifold;

an intake throttle in the intake of the engine;
one or more lateral sensors;
one or more tire pressure sensors coupled to one or more tires of the vehicle;
a controller storing instructions in non-transitory memory, that when executed, cause the controller to:
responsive to the vehicle being propelled in a forward direction by an engine coupled to one or more sets of drive wheels:
monitor tire pressure in the one or more vehicle tires;
monitor barometric pressure via the barometric pressure sensor;
control an intake air amount inducted into the engine intake manifold via the throttle when the vehicle is being propelled in the forward direction by the engine;
monitor vehicle pitch angle via the one or more lateral sensors in the vehicle, wherein a vehicle pitch angle greater than a threshold pitch angle indicates the vehicle is traveling downhill;
seal the evaporative emissions control system by closing the canister purge valve and closing the canister vent valve, and suspend purging of the fuel vapor canister responsive to a tire pressure decrease greater than a threshold and an absence of change in barometric pressure;
wherein the absence of change in barometric pressure includes indicating that a throttle position is greater than a throttle position threshold, the throttle position greater than the throttle position threshold indicating accurate barometric pressure readings as monitored by the barometric pressure sensor; and
wherein responsive to the absence of a change in barometric pressure and the throttle position less than the throttle position threshold, sealing the evaporative emissions control system and suspending purging of the fuel vapor canister responsive to the vehicle pitch angle less than the threshold pitch angle.

20. The system of claim 19, wherein the controller further stores instructions in non-transitory memory, that when executed, cause the controller to:
responsive to the vehicle being propelled in a reverse direction by the engine, or by an electric motor coupled to one or more sets of drive wheels:
monitor tire pressure in the one or more vehicle tires; and
seal the evaporative emissions control system by closing the canister purge valve and closing the canister vent valve, and suspending purging of the fuel vapor canister responsive to a vehicle speed below a threshold vehicle speed, and a tire pressure decrease greater than the threshold, wherein at least one or more rear tires experience the tire pressure decrease.

* * * * *